(12) United States Patent
Sahu et al.

(10) Patent No.: US 12,717,703 B2
(45) Date of Patent: Aug. 25, 2026

(54) ADAPTIVE CONTEXTUAL TEST AUTOMATION USING DOM COMPARISON

(71) Applicant: Dell Products L.P., Round Rock, TX (US)

(72) Inventors: Madhusmita Sahu, Singapore (SG); Yedukondalu Vanipenta, Singapore (SG); Antony Prabakaran Jayaveeran, Singapore (SG); Shree Ganesh Hanamappa Kashinakunti, Singapore (SG); Robin Kedia, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/019,975

(22) Filed: Jan. 14, 2025

(65) Prior Publication Data

US 2026/0203196 A1 Jul. 16, 2026

(51) Int. Cl.

| | |
|---|---|
| ***G06F 11/00*** | (2006.01) |
| ***G06F 11/07*** | (2006.01) |
| ***G06F 11/3668*** | (2025.01) |
| ***G06F 40/14*** | (2020.01) |

(52) U.S. Cl.

CPC ...... *G06F 11/3684* (2013.01); *G06F 11/0718* (2013.01); *G06F 11/3688* (2013.01); *G06F 40/14* (2020.01)

(58) Field of Classification Search

CPC ............................... G06F 40/14; G06F 11/368
USPC ...................................................... 702/17, 18
See application file for complete search history.

(56) References Cited

U.S. PATENT DOCUMENTS

| | | | | |
|---|---|---|---|---|
| 11,899,529 B2 * | 2/2024 | Garnara | .............. | G06F 11/0766 |
| 2006/0075305 A1 * | 4/2006 | Robinson | ............ | G06F 11/3684 714/38.1 |
| 2020/0034279 A1 * | 1/2020 | Shivam | ............... | G06F 11/3672 |
| 2021/0073110 A1 * | 3/2021 | Vidal | ..................... | G06N 3/006 |

(Continued)

FOREIGN PATENT DOCUMENTS

CN 119025397 A * 11/2024 ............. G06F 40/14

OTHER PUBLICATIONS

Testarchitect, "Tracking Known Bugs".*
Wikipedia, "Regression Testing" (Year: 2024).*

*Primary Examiner* — Bryce P Bonzo
*Assistant Examiner* — Gabriella Kanani Shelton
(74) *Attorney, Agent, or Firm* — Chamberlain, Hrdlicka, White, Williams & Aughtry; Aly Z. Dossa

(57) ABSTRACT

A method for generating test steps for a web application includes making a first determination that a test case for the web application has failed. The method further includes receiving a most recent historical document object model (DOM) state, and receiving a first current DOM state from a DOM storage. Further, the method includes comparing the most recent historical DOM state and the first current DOM state to receive a set of DOM differences. In addition, the method includes determining, using an identification engine, a set of elements and patterns based on the set of DOM differences. Further, the method includes generating, using a test step engine, modified test steps for the test case to receive a modified test case. The method also includes receiving an approval of the modified test case and executing, in response to the approval, the modified test case using the modified test steps.

17 Claims, 5 Drawing Sheets

(56) References Cited

U.S. PATENT DOCUMENTS

2022/0350733 A1* 11/2022 Vasavan .............. G06F 11/3692
2025/0225060 A1* 7/2025 Sahu ................... G06F 11/3684

* cited by examiner

ADAPTIVE CONTEXTUAL TEST AUTOMATION USING DOM COMPARISON

BACKGROUND

Web applications are widespread and used in many areas. Periodically, web applications require testing and maintenance to maintain smooth operations. Manual testing is often slow and cumbersome. Automated testing often faces challenges due to changes in the web application structure.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 2.2 shows a diagram of storage in accordance with one or more embodiments.

DETAILED DESCRIPTION

As part of the process of developing, updating, and deploying web applications, the web applications are tested for quality assurance purposes. Further, web applications are frequently updated to adapt to changing technical and consumer demands. As such, the testing of web applications is an integral part of the introduction and maintenance of web applications generally. The traditional approaches of testing web applications rely on manual test creation or record-and-playback methods which are time consuming and often error-prone. Without a solution, web application testing cannot be truly automated. The current methods of manually testing web applications is labor and cost intensive, which has led to increased efforts in automated testing for web applications.

However, automated testing often faces challenges due to changes in direct object model (DOM) structure. The changes introduced from updating web applications often result in testing frameworks being unable to interact with web page elements due to a mismatch in expectations versus realized results, which can lead to the automated test either being unable to complete its test or indicating that the test has failed when there are no errors present. As such, current automated testing still heavily relies on manual solutions for such DOM differences and lacks the flexibility to create efficient solutions.

The limitations of the traditional approaches to testing web applications restrict the efficiency of web applications by increasing the downtime when testing fails. For at least the reasons discussed above, a different approach is needed to address these challenges and improve the efficiency and reliability of automated web application testing. Embodiments described herein relate to a method and system for generating test steps for a web application by taking periodic snapshots of the DOM state of a web application and comparing newer snapshots to older snapshots to identify changes in the DOM between snapshots. Then, these changes are used to generate test steps that target the relevant changes in the DOM. As a result of the methods and systems discussed in greater detail below, one or more embodiments disclosed herein provide an automated solution to testing web applications that can adapt to DOM changes while maintaining accuracy and reliability of the testing frameworks, thereby reducing the time and cost for web application testing, reducing the time that web applications are down for failing testing, and increasing the rate at which web application may be updated.

Specific embodiments will now be described with reference to the accompanying figures.

Figure 1:
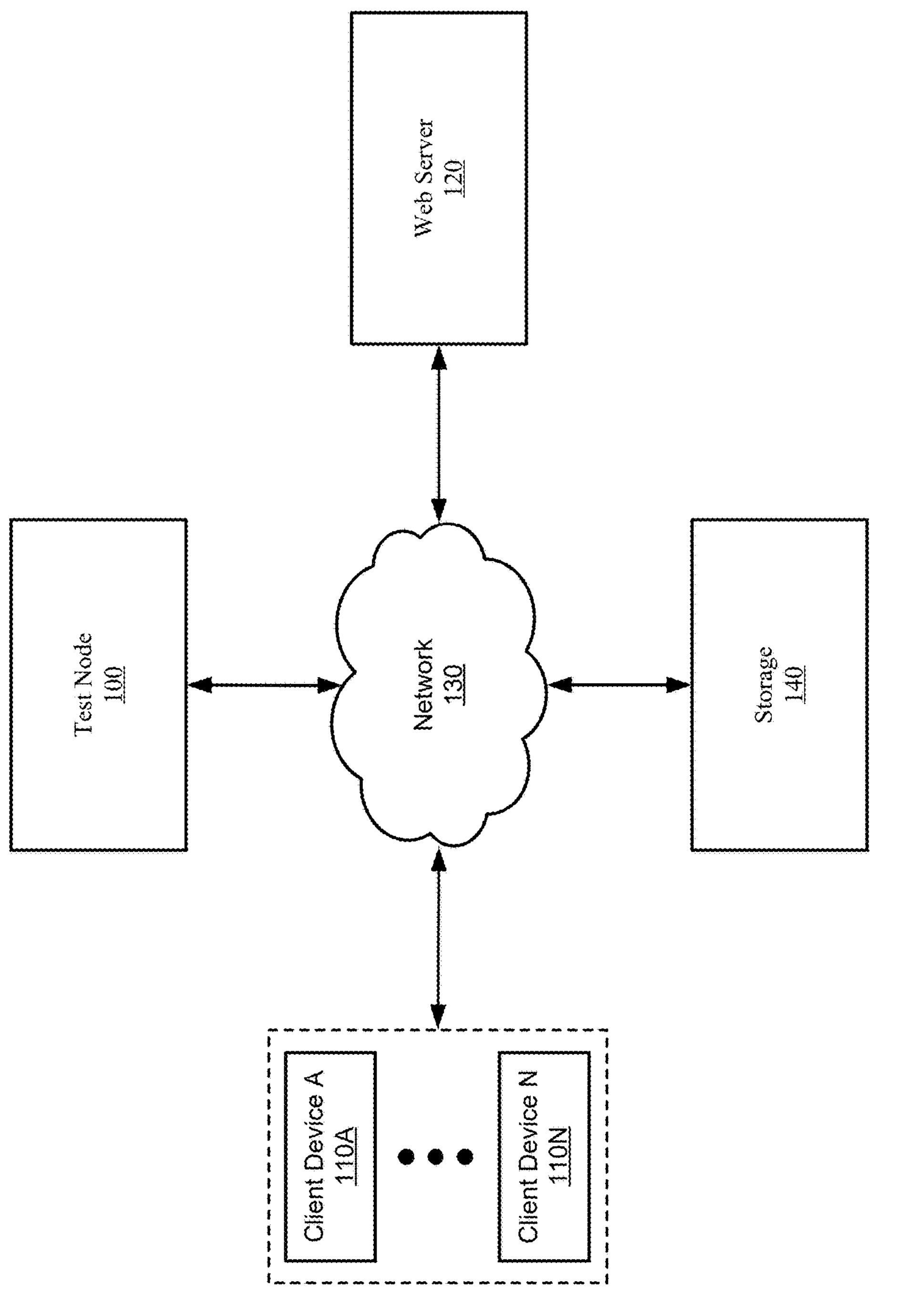
FIG. 1 shows a diagram of a system in accordance with one or more embodiments.

FIG. 1 shows a system in accordance with one or more embodiments. The system may include a test node (100), any number of client devices (e.g., client device A (110A), client device N (110N), etc.), a web server (120), a network (130), and storage (140). The system may include additional, fewer, and/or different components without departing from the scope described herein. Each component may be operably/operatively connected to any of the other components via any combination of wired and/or wireless connections. Each of these system components is described below.

In one or more embodiments, the test node (100), client devices (e.g., 110A, 110N, etc.), the web server (120), and the storage (140) may be operatively connected to one another through the network (130) (e.g., a local area network (LAN), a wide area network (WAN) such as the Internet, a mobile network, any other network type, or a combination thereof). The network (130) may be implemented using any combination of wired and/or wireless connections. Further, the network (130) may encompass various interconnected, network-enabled subcomponents (or systems) (e.g., switches, routers, gateways, etc.) that may facilitate communications between the test node (100), client devices (e.g., 110A, 110N, etc.), the web server (120), and the storage (140). Moreover, the test node (100), client devices (e.g., 110A, 110N, etc.), the web server (120), and the storage (140) may communicate with one another using any combination of wired and/or wireless communication protocols. In one or more embodiments, the test node (100), client devices (e.g., 110A, 110N, etc.), the web server (120), and the storage (140) may be located on a single physical and/or logical computing system.

In one or more embodiments, the test node (100) includes functionality to interact with a testing framework, such as Selenium, Cypress, Jest, Mocha, etc., to provide a structured environment for writing automated tests to verify the functionality, structure, and visual appearance of HTML elements within a web application. It should be appreciated that the test node (100) may verify other aspects of HTML elements beyond those listed here without departing from the disclosure provided herein. In one or more embodiments, the test node includes functionality to receive an initial test case whose execution failure causes the web page testing to halt, parse the initial test case to identify a cause for the execution failure, compare the execution failure to defined rules associated with the testing framework providing the environment for the web page testing, and generate new test steps to resume testing the web page. Further, in one or more embodiments, the test node (100) includes functionality to receive DOM states from the storage (140), identify unexpected elements based on changes within the DOM states, and/or send the information associated with the unexpected elements to other components shown in FIG. 2.1. In one or more embodiments, in order to receive DOM states, initial test cases, and send information, the test node (100) may communicate with, for example, the storage (140) and/or the web server (120). In one or more embodiments, the test node (100) includes functionality to perform at least a portion of the methods shown in FIG. 3 and FIG. 4.

Figure 5:
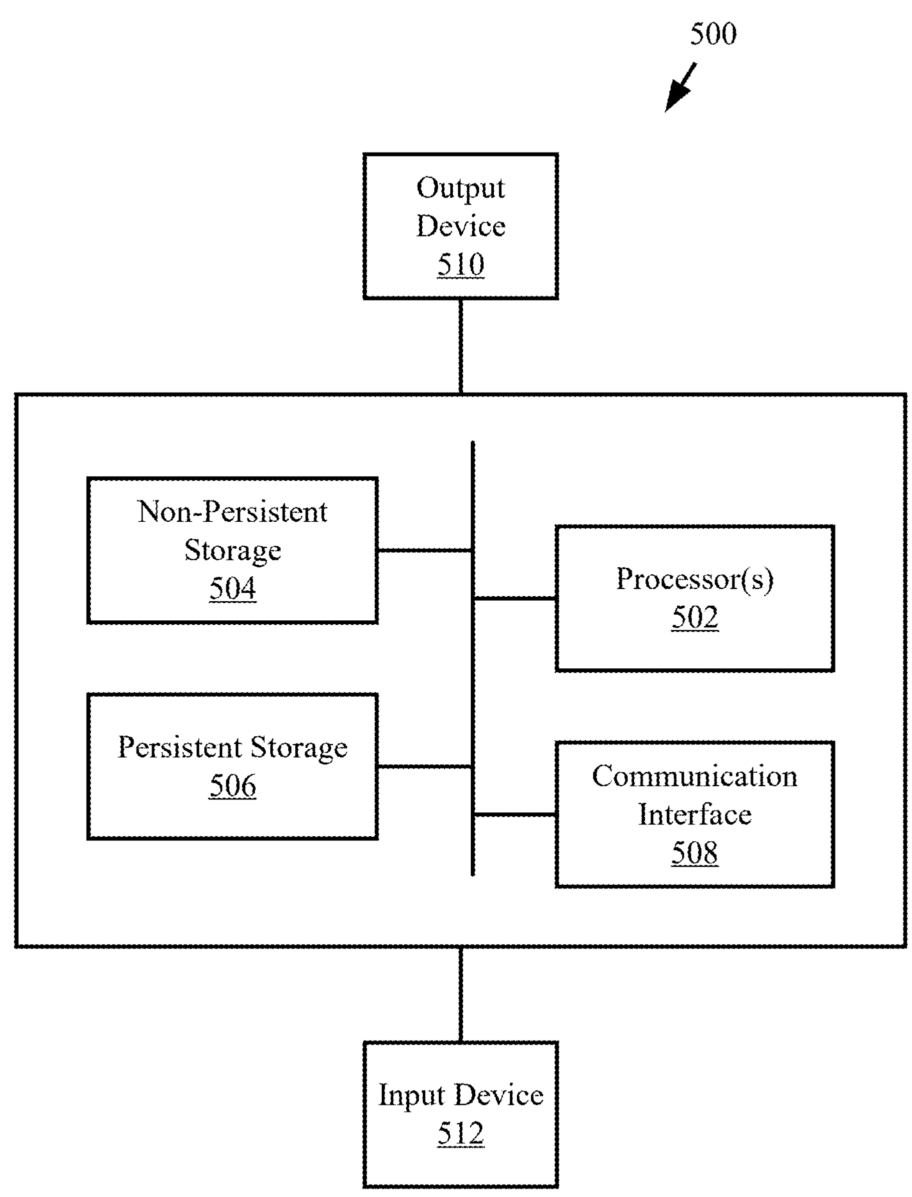
FIG. 5 shows a computing system in accordance with one or more embodiments.

In one or more embodiments, the test node (100) may include functionality to evaluate a modified test case. Further, in one or more embodiments, the test node (100) may include functionality to publish the modified test case or generate a pull request for a test engineer to review before publishing. As used herein, publish means to execute the modified test case on a web server (120) hosting a testing framework to test the web application. As used herein, a pull request is a proposal to execute the modified test case, which may include details such as differences between the initial test case and the modified test case, DOM differences highlighting the reasoning for an initial error state, explanations of how the modified test case may resolve error state to resume the automated testing, and/or a timeline on how quickly executing will resolve the errors to resume automated testing. In one or more embodiments, the pull request may be a text string or an overview page displayed on a screen using a computing device (FIG. 5). Any method can be used to display the pull request without departing from the embodiments disclosed herein. Additional details of the test node (100) are described below in reference to FIG. 2.1.

In one or more embodiments, the client devices (e.g., 110A, 110N, etc.) include functionality to interact with web applications, which may be hosted on any combination of the test node (100), client devices (e.g., 110A, 110N, etc.), the web server (120), and the storage (140). In one or more embodiments, the client devices (e.g., 110A, 110N, etc.) enable users to interact with web applications to: (i) utilize the functionality provided by the web applications; (ii) update the web applications; (iii) develop new web applications; (iv) deploy web applications; and/or (v) test web applications. In one or more embodiments, any number of client devices (e.g., 110A, 110N, etc.) may interact with any number of web applications operatively connected to the network (130).

In one or more embodiments disclosed herein, the web server (120) includes functionality to host and enable the interaction with web applications. For example, the web server (120) may host a web application that is utilized by a large number of remote users (e.g., via the client devices (e.g., 110A, 110N, etc.)). In one or more embodiments, the web server (120) also includes functionality to operate in conjunction with the test node (100) to modify or test any web applications hosted on the web server (120). Further, in one or more embodiments, the web server (120) also includes functionality to host and enable the interaction with testing frameworks. For example, the web server (120) may host a Selenium testing framework that provides an environment for automated testing by the test node (100).

In one or more embodiments, the storage (140) includes functionality to store data relating to the operation of the test node (100) and/or the web server (120), including (i) DOM states, such as current and historical DOM states; (ii) testing frameworks; (iii) web applications; (iv) test cases; (v) execution failure rules; and (vi) HTML elements. The storage (140) may be volatile storage, non-volatile storage, or any combination thereof. Examples of a storage include (but are not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory.

In one or more embodiments, the storage (140) is demonstrated as a separate entity from the other components, such as the test node (100); however, embodiments disclosed herein are not limited as such. The storage (100) may be demonstrated as part of the test node (100) or other component without departing from the scope of the disclosure herein. Additional details regarding one or more embodiments of the storage (140) are described in FIG. 2.2.

In one or more embodiments, any combination of the test node (100), client devices (e.g., 110A, 110N, etc.), the web server (120), and the storage (140) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the relevant test node (100), client devices (e.g., 110A, 110N, etc.), the web server (120), or the storage (140) described throughout the application.

Further, in one or more embodiments, any combination of the test node (100), client devices (e.g., 110A, 110N, etc.), the web server (120), and the storage (140) may be implemented as a logical device.

In one or more embodiments, the network (130) may represent a (decentralized or distributed) computing network and/or fabric configured for computing resource and/or messages exchange among registered computing devices (e.g., the client device (e.g., 110A, 110N, etc.), the test node (100), the web server (120), the storage (140), etc.). As discussed above, components of the system may operatively connect to one another through the network (e.g., a storage area network (SAN), a personal area network (PAN), a LAN, a metropolitan area network (MAN), a wireless area network (WAN), a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the client device (e.g., 110A, 110N, etc.) and the web storage (120) through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system. In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

Figure 2:
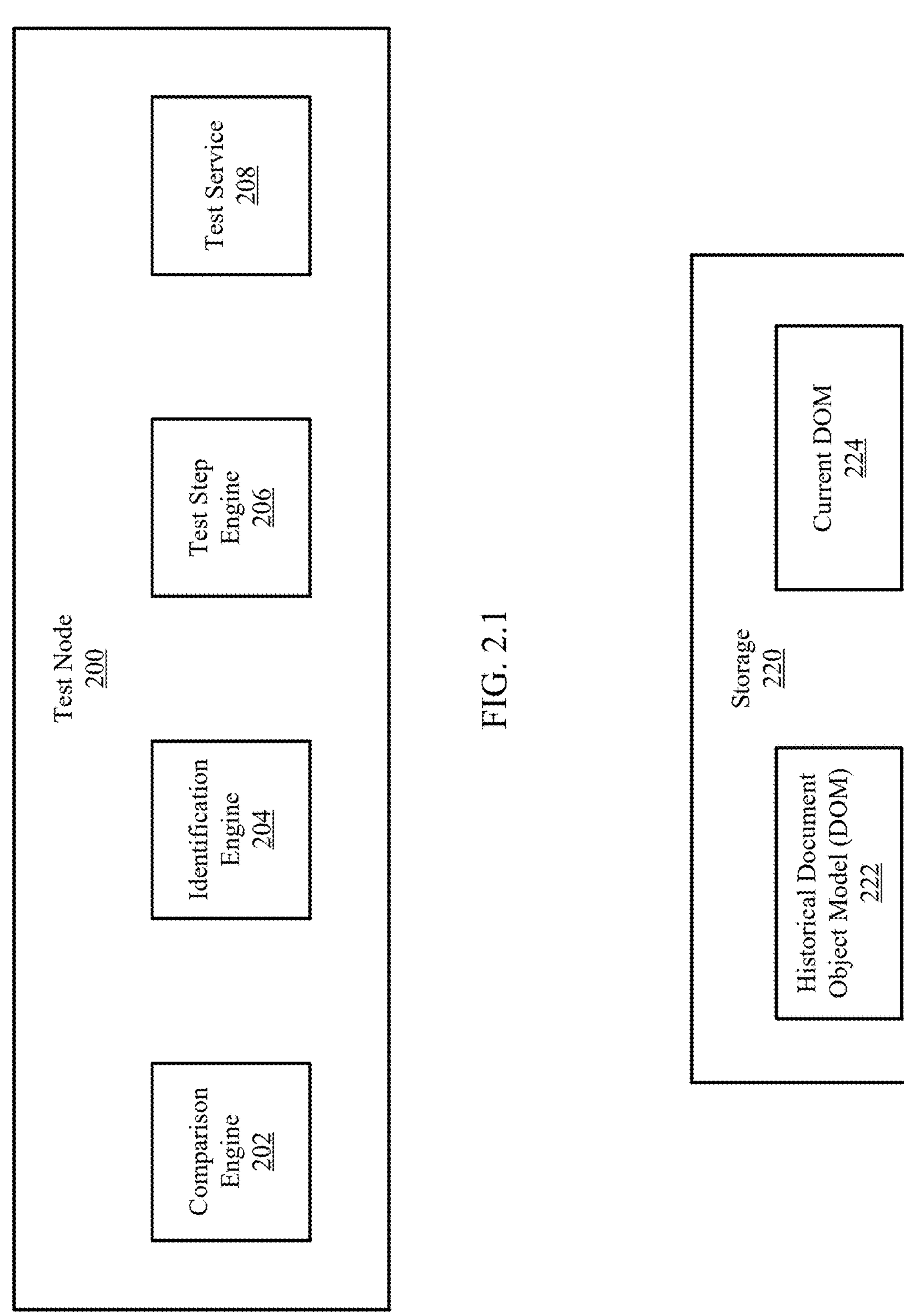
FIG. 2.1 shows a diagram of a test node in accordance with one or more embodiments.

Turning now to FIG. 2.1., FIG. 2.1 shows a diagram of a test node (100) in accordance with one or more embodiments. The test node includes a comparison engine (202), an identification engine (204), a test step engine (206), and a test service (208). The test node (100) may include additional, fewer, and/or different components without departing from the scope of the embodiments disclosed herein. For example, the test node (100) may contain a large language model (not shown) to identify additional causes for the error in the initial test case. across multiple servers, VMs, or containers, for scalability and fault tolerance. Each component may be operably connected to any of the other component via any combination of wired and/or wireless connections. Each of these components is described below.

In one or more embodiments, the comparison engine (202) includes functionality to compare a most recent historical DOM state and a first current DOM state to identify differences between the DOM states. In one or more embodiments, a DOM refers to a programming interface that represents the structure of a web application as a tree of objects, allowing the test node (100) to access and manipulate the web application through the tree of objects. In one or more embodiments, the DOM includes a hierarchical structure where each HTML element is a node in the tree with parent-child relationships. In one or more embodiments, the test node (100) tests web applications using the DOM.

In one or more embodiments, the comparison includes identifying changed or altered elements between the DOM states. As a non-limiting example, the most recent historical DOM state may include a branch ending with a node representing an HTML element. In the first current DOM state, the node at the end of the branch in the DOM may be missing, resulting in an error state as the test node (100) would expect to interact with the missing node. Accordingly, the comparison engine (202) would parse the DOM structure in both DOM states and identify the difference as a missing node. This difference would then be packaged into a set of DOM differences. In one or more embodiments, the comparison engine (202) may continue to identify all differences within the DOM states after identifying one difference. Each difference may be added to the set of DOM differences.

In one or more embodiments, the comparison engine (202) may include a large language model (LLM) that is trained to identify DOM changes between the most recent historical DOM state and the first current DOM state. The differences may be identified by obtaining vector distances by tokenizing JavaScript Object Notation (JSON) representations into tokens; passing the token sequences through the LLM to obtain embeddings; and comparing the embeddings using a vector distance metric. In one or more embodiments, the JSON representations are a standard text-based representation of the DOM and are stored in the storage (140). Used herein, tokens are text units that LLMs process to obtain results. In one or more embodiments, the training may include receiving multiple vector distances based on embeddings to determine which distances are great enough to cause an error state. In one or more embodiments, the comparison engine (202) receives inputs from storage (140) and sends outputs to an identification engine (204).

In one or more embodiments, the identification engine (204) includes functionality to identify a set of elements and patterns within the DOM state differences. The set of elements and patterns includes scenarios such as HTML element addition, element removal, and/or element property changes. In one or more embodiments, the HTML element addition scenario includes an unexpected additional HTML element in the DOM state. In one or more embodiments, the HTML removal scenario includes the identification engine not locating an expected HTML element in the DOM state. In one or more embodiments, the HTML element property change includes the identification engine identifying unexpected properties within an expected HTML element. The identification engine (204) may identify other scenarios outside of those listed in this detailed description without departing from the scope herein.

In one or more embodiments, the identification engine (204) identifies DOM differences based on error states that caused the web application to malfunction. The identification engine (204) may identify the set of elements and patterns by categorizing identified changes in the DOM states from the historical DOM state to the current DOM state. The categories may include addition, deletion, attribute modification, element property modification, and/or any other category that allows for categorization into distinct types. In one or more embodiments, the identification engine (204) may include an LLM trained to categorize the set of DOM differences into a set of differences and patterns. The LLM may also use supervised machine learning techniques (e.g., decision trees, random forests, etc.) to categorize the set of DOM differences. The LLM may be trained on common web application error states such as those described in the scenarios above. As a further, non-limiting example, an additional HTML element in the DOM state may be a common error that may cause the automated testing to halt. In this example, the identification engine (204) may categorize this as an addition and add this to the set of elements and patterns causing the automated testing to stall. In one or more embodiments, the LLM used by the identification engine (204) may be the same LLM used by the comparison engine (202). In one or more embodiments, any LLM may be used by the identification engine (204) without departing from the scope disclosed herein.

In one or more embodiments, the test step engine (206) includes functionality to generate modified test steps for a test case based on the set of elements and patterns identified by the identification engine (204). In one or more embodiments, the test step engine (206) may receive inputs in the form of a set of elements and patterns from the identification engine (204). In one or more embodiments, the test step engine (206) may generate the test steps as a pull request that is manually confirmed by an engineer. The modified test steps may include HTML element modification, addition, removal, or any other change that will resolve the error state and continue automated testing. As a non-limiting example, the modified test step may be a modification to the initial test case adding a step to include an additional HTML element. As another example, the modified test step may be a replacement for the entire initial test case with a new test case. In one or more embodiments, the modified test steps may modify one or more steps within the initial test case. In one or more embodiments, the modified test steps may fully replace the initial test case without reusing any steps from the initial test case.

In one or more embodiments, the test service (208) includes functionality to host the testing framework in combination with the web server (120) that can execute the modified test steps. Such testing framework may include existing frameworks like Selenium or any other known framework. In one or more embodiments, the test service (208) receives inputs from the test step engine (206) and executes the modified test steps.

In one or more embodiments, the test service (208) may include functionality to receive confirmation from an operator or engineer that the modified test steps are accurate. The operator or engineer may provide feedback through an application programming interface (API), manually load the modified test steps, or confirm the modified test steps in any other manner to authorize test step execution. In one or more embodiments, the test service (208) may generate a pull request based on the modified test steps and send the pull request to the operator or engineer for review. In one or embodiments, the test service (208) may execute the modified test steps utilizing a testing framework. Prior to executing, in one or embodiments, the test service may wait for confirmation via the pull request before executing.

Turning to FIG. 2.2, FIG. 2.2 shows a diagram of storage (220) in accordance with one or more embodiments. In one or more embodiments, the storage may store DOM states periodically received by the test node (100). In one or more embodiments, the DOM states may include a historical DOM (222) and current DOM (224). In one or more embodiments, the storage (220) may include functionality to replace DOM states with more current DOM states. As a non-limiting example, the storage (220) may include functionality to replace a first historical DOM with a first current DOM, call the first current DOM as a second historical DOM, and after, replace the first current DOM with a second current DOM. In one or more embodiments, this iterative DOM replacement method maintains the latest DOM state within the storage while retaining the previous DOM state for comparison purposes.

In one or more embodiments, the storage may include the functionality to store tokens and embeddings generated by other components in the system (e.g., the test node (200)). As a non-limiting example, the storage (220) may receive JSON representation tokens of the DOM states, send the tokens to other components in the system, and in turn receive embeddings based on the tokens. Additionally, in one or more embodiments, the storage may contain other information related to the web application including a locator (e.g., XPath, CSS Selector, etc.) and/or HTML element state (e.g., visible elements, interactable elements, hidden elements, etc.). One of ordinary skill will appreciate that the storage (220) may perform other functionalities without departing from the scope of the disclosure.

In one or more embodiments, the historical DOM (222) may include functionality to store the previous DOM state within the storage. In one or more embodiments, the historical DOM (222) may include functionality to overwrite the stored data, the previous DOM state, and replace with a new previous DOM state. In one or more embodiments, the new previous DOM state may be the DOM state representation stored in the current DOM before the current DOM updates its stored DOM state representation. In one or more embodiments, the historical DOM (222) may include functionality to periodically update the previous DOM state based on when the current DOM (224) updates its stored current DOM state.

In one or more embodiments, the current DOM (224) may include functionality to store the current DOM state within the storage. In one or more embodiments, the current DOM (224) may include functionality to overwrite the stored data, the current DOM state, and replace with a new current DOM state. The current DOM (224) may periodically update the DOM state based on a time element, a new error state, or any other indication to update the current DOM. As a non-limiting example, the current DOM (224) may capture a new current DOM state at the instance the automated testing stops due to encountering an error. If there is a previous current DOM state in the current DOM, the current DOM (224) may remove the current DOM state and send the previous current DOM state to the historical DOM (222). After removing, the current DOM may store the new current DOM in the current DOM.

Figure 3:
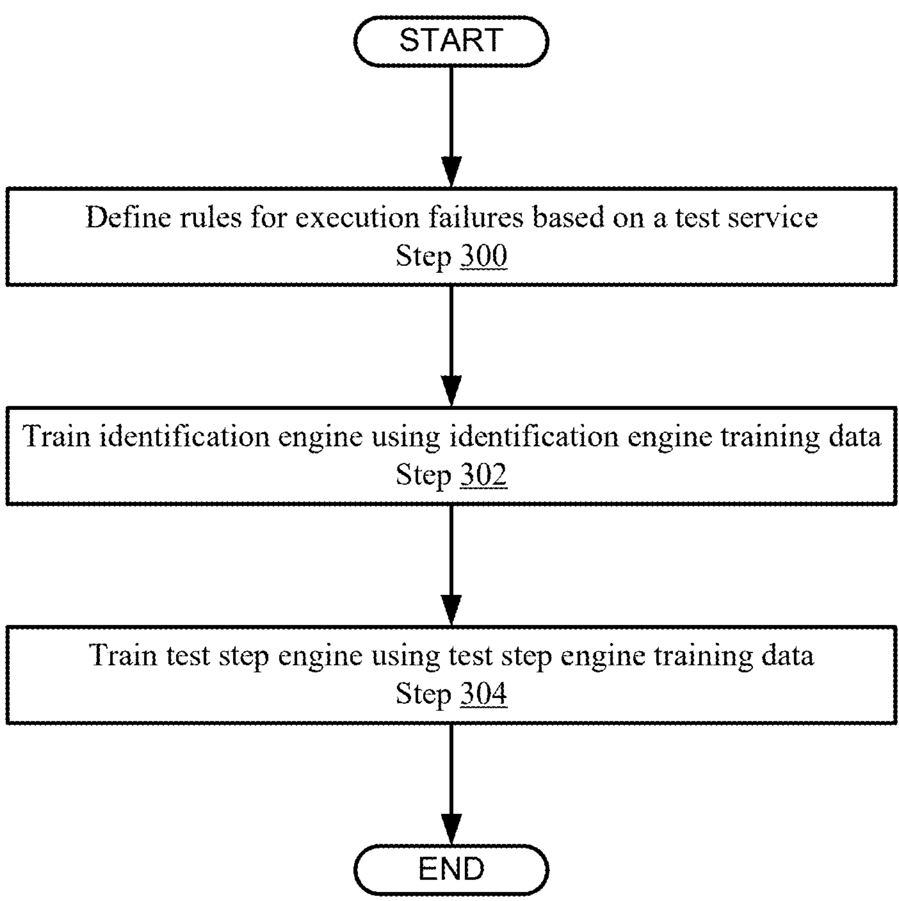
FIG. 3 shows a flowchart of a method for training a test step engine in accordance with one or more embodiments.

Turning to FIG. 3, FIG. 3 shows a flowchart describing a method for training a test step engine (e.g., 206 in FIG. 2.1) in accordance with one or more embodiments. The method may be performed by, for example, the identification engine (204) and the test step engine (206). Other components in the system may perform this method.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIG. 4.

In step 300, rules are defined for execution failures based on a test service. In one or more embodiments, each test framework within a test service has different rules for execution failures. As a non-limiting example, a Selenium framework may have multiple defined rules. Such rules could include ElementNotInteractable, when an element within a web application is not in a state that can be interacted with, MultipleElementException, when multiple elements within a web application are found for a given locator, NoSuchElementException, when an element within a web application is not found in the DOM, and ElementNotVisibleException, when an element within a web application is not visible on the webpage. There may be more defined rules necessary for handling execution failures beyond those disclosed in this detailed description, which may also be dependent on the rules available within a given testing framework.

In step 302, the identification engine (204) is trained using identification engine training data. In one or more embodiments, identification engine training data may include supervised machine learning techniques (e.g., decision trees or random forests). The training data may also include categories to categorize DOM changes into distinct types. In one or more embodiments, these categories may include addition, deletion, and attribute modification. The training data may further include previous automated testing errors. One of ordinary skill will appreciate that the identification engine training data may include other aspects without departing from the scope of the disclosure.

In step 304, the test step engine (206) may be trained using test step engine training data. In one or more embodiments, test step engine training data may include common test steps for web application errors. One of ordinary skill will appreciate that the test step engine training data may include other aspects without departing from the scope of the disclosure. In one or more embodiments, the method may end.

Figure 4:
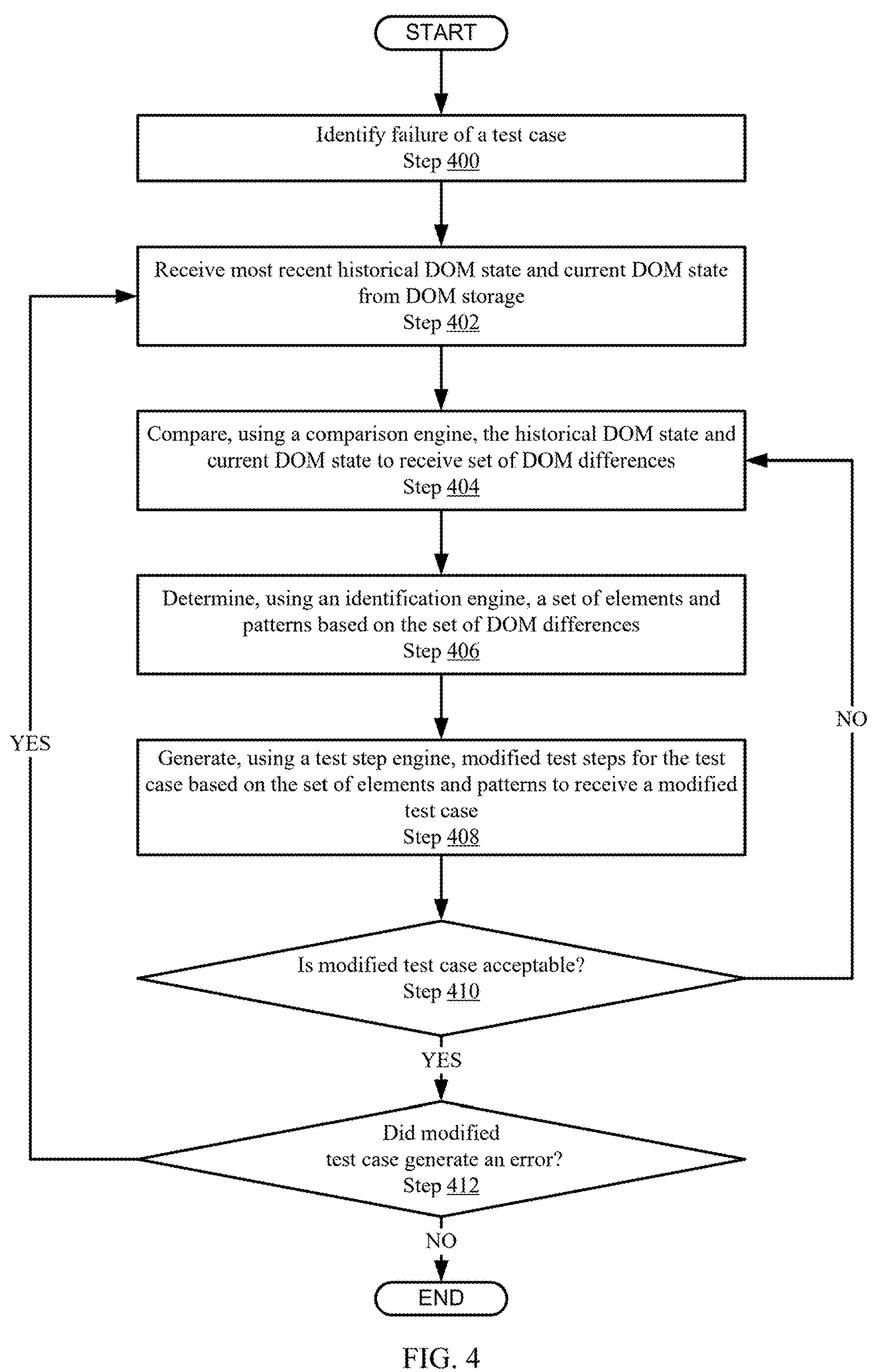
FIG. 4 shows a flowchart of a method for generating test steps for a web application in accordance with one or more embodiments.

Turning to FIG. 4, FIG. 4 shows a flowchart of a method for generating test steps for a web application in accordance with one or more embodiments. The method may be performed by, for example, the test node (e.g., 200, FIG. 2.1). Other components in the system may perform this method without departing from the disclosure herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIG. 3.

In step 400, the test node identifies a failure of a test case. In one or more embodiments, such failure may be caused by inconsistencies between the expected and actual DOM structure. Such failures may correlate to the previously defined rules for execution failures. As a non-limiting example, the identified failure may be the test node not expecting an HTML element and identifying one.

In step 402, the test node, receives the most recent historical DOM state and current DOM state from a storage (e.g., 220, FIG. 2.2). The most recent historical DOM state is the latest DOM state taken by the historical DOM (e.g., 222, FIG. 2.2) before the test node) identifies a failure of a test case. The current DOM state is the DOM state taken by the current DOM (e.g., 224, FIG. 2.2) right after the test node identifies a failure of a test case. The most recent historical DOM state and the current DOM state capture the differences between the expected and actual DOM states the test node is expecting while running a test case for a web application.

In step 404, the comparison engine (e.g., 202, FIG. 2.1) compares the historical DOM state and the current DOM state to receive a set of DOM differences. In one or more embodiments, the set of DOM differences may be received as a text file, lines of code, or any medium that can send and receive data. In one or more embodiments, the comparison engine may perform comparisons using a pretrained LLM. As a non-limiting example, the comparison engine may compare branches in the stored DOM states to identify which elements contain differences. These examples are not meant to limit the embodiments and more scenarios may be considered during comparison without departing from the scope herein. In one or more embodiments, the comparison may involve tokenizing JSON representations into sequences of tokens, passing the sequences through the comparison engine to obtain embeddings, and comparing the embeddings to receive DOM differences.

In step 406, the identification engine (e.g., 204, FIG. 2.1) determines a set of elements and patterns based on the set of DOM differences received in step 404. In one or more embodiments the set of elements and patterns capture the DOM differences between the most recent historical DOM state and the current DOM state. As a non-limiting example, the elements may include aspects of the web application.

In step 408, the test step engine (e.g., 206, FIG. 2.1) generates modified test steps for the test case based on the set of elements and patterns to receive a modified test case. In one or more embodiments, the modified test steps modify the test case that the test node identifies as a failure. As a non-limiting example, the modified test steps may include generating a new test step for new elements, ignoring test steps for removed elements when expected removal does not occur, and creating new test steps for changed properties. One of ordinary skill will appreciate that the test step engine may perform other functionalities and modify test cases beyond the example provided without departing from the scope of the disclosure.

In step 410, the test node makes a determination as to whether the modified test case is acceptable. In one or more embodiments, the modified test case may be confirmed by an operator or an engineer. Any qualified individual may confirm the modified test case without departing from the scope of the disclosure. Accordingly, in one or more embodiments, if the result of this determination is YES, the method proceeds to step 412. If the result of the determination is NO, the method may revert to step 404 and a new comparison is made for the existing DOM states in the storage. In one or more embodiments, the method will continue to be performed until modified test steps are generated that pass confirmation.

In step 412, the test node makes a determination if the modified test case generates an error. In one or more embodiments, the test service runs the modified test case generated by the test node and the determination confirms if the web application testing proceeds. Accordingly, in one or more embodiments, if the result of the determination is YES, the method proceeds to step 402 and a new set of DOM states are stored in storage. If the result of the determination is NO, the method ends, and the test case errors are considered to be resolved.

Embodiments of the disclosure may be implemented using computing devices. FIG. 5 shows a diagram of a computing device (500) in accordance with one or more embodiments. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (508), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. The communication interface (508) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (508, 510) may be locally or remotely connected to the computer processor(s) (502), non-persistent storage (504), and persistent storage (506). Many diverse types of computing devices exist, and the aforementioned input and output device(s) (510, 508) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments were described with reference to the accompanying figures. In the above detailed description of the embodiments, numerous specific details are set forth in order to provide a more thorough understanding of one or more embodiments. However, it will be apparent to one of ordinary skill in the art that the one or more embodiments may be practiced without these specific details. In other instances, well-known features have not been described in detail to avoid unnecessarily complicating the description.

In the prior description of the figures, any component described with regard to a figure, in various embodiments, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating test steps for a web application, the method comprising:

making a first determination that a test case for the web application has failed;

receiving, in response to the first determination, a most recent historical document object model (DOM) state and a first current DOM state from a DOM storage, wherein the most recent historical DOM state and the first current DOM state are associated with the web application;

comparing, using a comparison engine, the most recent historical DOM state and the first current DOM state to receive a set of DOM differences;

determining, using an identification engine, a set of elements and patterns based on the set of DOM differences;

generating, using a test step engine, modified test steps for the test case based on the set of elements and patterns to receive a modified test case;

receiving an approval of the modified test case;

executing, in response to the approval, the modified test case using the modified test steps;

receiving, based on the execution of the modified test case, a second current DOM state, wherein the second current DOM state is associated with the web application;

making a second determination that execution of the modified test case generated an error;

comparing, based on the second determination, the first current DOM state and the second current DOM state to receive a second set of DOM differences;

generating second modified test steps for the modified test case based on the second set of DOM differences to obtain a second modified test case; and executing the second modified test case.

2. The method of claim 1, wherein the set of elements and patterns comprises hypertext markup language elements.

3. The method of claim 1, wherein the method further comprises:

determining a mapping between the set of elements and patterns and potential modified test steps, and wherein generating the modified test steps is also based on the mapping.

4. The method of claim 1, wherein the modified test steps comprise a first new test step based on element addition, a removal of a test step based on element removal, or a second new test step based on a property change.

5. A method for generating test steps for a web application, the method comprising:

receiving a most recent historical document object model (DOM) state and a current DOM state from a DOM storage, wherein the most recent historical DOM state and the current DOM state are associated with the web application;

comparing the most recent historical DOM state and the current DOM state to receive a set of DOM differences;

generating modified test steps for a test case based on the set of DOM differences to receive a modified test case, wherein the test case tests one or more features of the web application;

executing the modified test case using the modified test steps;

receiving, based on the execution of the modified test case, a second current DOM state, wherein the second current DOM state is associated with the web application;

making a second determination that execution of the modified test case generated an error;

comparing, based on the second determination, the current DOM state and the second current DOM state to receive a second set of DOM differences;

generating second modified test steps for the modified test case based on the second set of DOM differences to obtain a second modified test case; and executing the second modified test case.

6. The method of claim 5, wherein the method further comprises:

making, prior to receiving the most recent historical DOM state, a first determination that a test case for the web application has failed.

7. The method of claim 5, wherein the method further comprises:

determining a set of elements and patterns based on the set of DOM differences, and wherein generating the modified test steps is also based on the set of elements and patterns.

8. The method of claim 7, wherein the set of elements and patterns comprises hypertext markup language elements.

9. The method of claim 7, wherein the method further comprises:

determining a mapping between the set of elements and patterns and potential modified test steps, and wherein generating the modified test steps is also based on the mapping.

10. The method of claim 5, wherein the method further comprises:

receiving, prior to executing the modified test case, an approval of the modified test case.

11. The method of claim 5, wherein the modified test steps comprise a first new test step based on element addition, a removal of a test step based on element removal, or a second new test step based on a property change.

12. A non-transitory computer readable medium comprising computer readable program code, which when executed by a computer processor enables the computer processor to perform a method for generating test steps for a web application, the method comprising:

receiving a most recent historical document object model (DOM) state and a current DOM state from a DOM storage, wherein the most recent historical DOM state and the current DOM state are associated with the web application;

comparing the most recent historical DOM state and the current DOM state to receive a set of DOM differences;

generating modified test steps for a test case based on the set of DOM differences to receive a modified test case, wherein the test case tests one or more features of the web application;

executing the modified test case using the modified test steps;

receiving, based on the execution of the modified test case, a second current DOM state, wherein the second current DOM state is associated with the web application;

making a second determination that execution of the modified test case generated an error;

comparing, based on the second determination, the current DOM state and the second current DOM state to receive a second set of DOM differences;

generating second modified test steps for the modified test case based on the second set of DOM differences to obtain a second modified test case; and executing the second modified test case.

13. The non-transitory computer readable medium of claim 12, wherein the method further comprises:

making, prior to receiving the most recent historical DOM state, a first determination that a test case for the web application has failed.

14. The non-transitory computer readable medium of claim 12, wherein the method further comprises:

determining a set of elements and patterns based on the set of DOM differences, and wherein generating the modified test steps is also based on the set of elements and patterns.

15. The non-transitory computer readable medium of claim 14, wherein the set of elements and patterns comprises hypertext markup language elements.

16. The non-transitory computer readable medium of claim 14, wherein the method further comprises:

determining a mapping between the set of elements and patterns and potential modified test steps, and wherein generating the modified test steps is also based on the mapping.

17. The non-transitory computer readable medium of claim 12, wherein the method further comprises:

receiving, prior to executing the modified test case, an approval of the modified test case.

* * * * *